No. 728,205. PATENTED MAY 19, 1903.
W. CORMACK.
PROCESS OF MAKING GELATIN.
APPLICATION FILED NOV. 10, 1902.
NO MODEL.
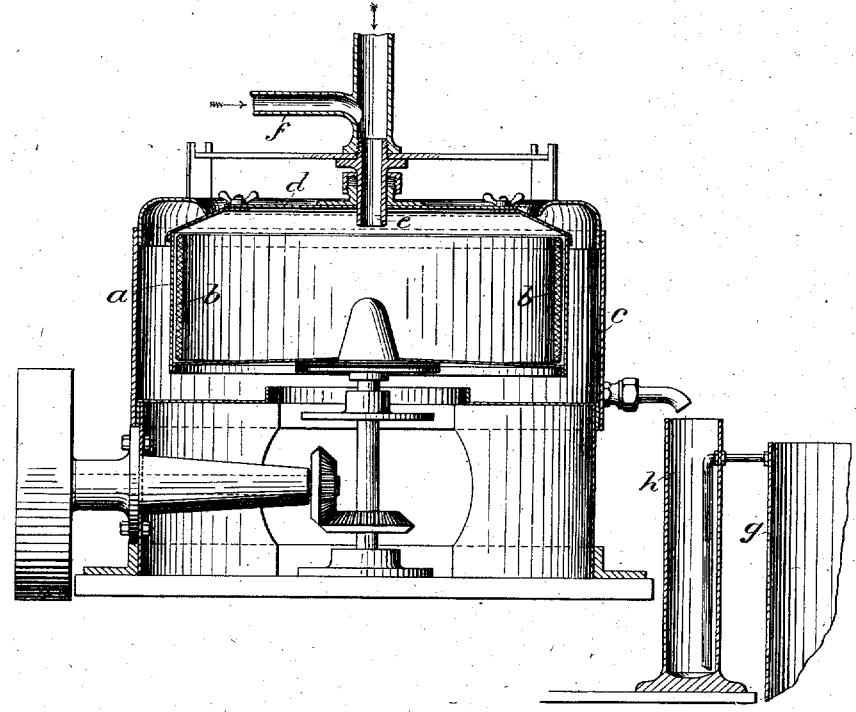
Witnesses.
E. Hanusch
B. Briner
Inventor.
William Cormack
by B. Singer
Att'y.

No. 728,205. Patented May 19, 1903.

UNITED STATES PATENT OFFICE.

WILLIAM CORMACK, OF ESKBANK, SCOTLAND, ASSIGNOR OF ONE-HALF TO JAMES GRAY FLOWERDEW LAWSON, OF POLTON, SCOTLAND.

PROCESS OF MAKING GELATIN.

SPECIFICATION forming part of Letters Patent No. 728,205, dated May 19, 1903.

Application filed November 10, 1902. Serial No. 130,769. (No specimens.)

*To all whom it may concern:*

Be it known that I, WILLIAM CORMACK, a citizen of the United Kingdom of Great Britain and Ireland, residing at 3 Westfield Place, Eskbank, Mid-Lothian, Scotland, have invented certain new and useful Improvements in Processes of Making Gelatin, (for which application has been made in Great Britain, No. 20,800, dated September 24, 1902,) of which the following is a specification.

In the manufacture of gelatin as ordinarily practiced animal pelts or skins washed and otherwise prepared are subjected to stewing or boiling in an infusor with water, which is periodically run off as the gelatin dissolves in it, the operation, which is intermittent, being repeated until the bulk of the gelatin is extracted, and owing to the decomposition of the tissue in the skins due to prolonged treatment and the draining off with the gelatin solution of decomposing matter the product is in general more or less discolored and impure.

The object of my invention is to produce gelatin which is practically free from such discoloration and impurity and that by a continuous as distinguished from the usual intermittent treatment of the skins. For that purpose the washed or otherwise prepared pelts or skins or other such gelatinous materials are cut up and placed in a hydro-extractor or centrifugal machine whose rotating basket is fitted with a closing-cover through which is led a steam-pipe arranged to discharge steam or steam and hot water into the basket. The centrifugal basket is rotated at a comparatively slow speed while the condensed steam or water passes through the pelts and dissolves out the gelatin, the solution escaping through the perforated shell and through a filtering medium within the shell. This action is continued until the whole of the gelatin contained in the skins is dissolved out and discharged from the centrifugal, and owing to the short duration of the treatment and the absence of the tissue in the product a purer solution of gelatin is obtained, while the percentage yield is increased.

The accompanying drawing illustrates, by way of example, an arrangement of centrifugal machine as used for carrying out the invention.

The centrifugal basket $a$, in which the skins are placed, is provided with a layer $b$ of filtering medium, through which the liquid gelatin passes into the outer casing $c$. The basket is inclosed or provided with a cover $d$, through which is led the end of a steam-pipe $e$, having a branch $f$ for admission of hot water when desired. The basket is rotated in the usual way, but slowly, and the gelatin which is dissolved out of the skins by the condensing steam or hot water and passes into the casing $c$ is drained off through a tap either direct to a tank $g$ or first through an open vessel $h$, in which its density may be estimated and from which it is siphoned off into the collecting-tank $g$. The solution collected in the tank may be subsequently run through a cream-separator to remove any fat which may be present, and it is then concentrated in a vacuum-pan and dried in the ordinary way.

The process of dissolving out the gelatin in pelts or skins may obviously be applied for obtaining gelatin from other gelatinous substances or from residues containing free gelatin, such as constitute waste material in size manufacture.

Having now particularly described my invention, what I claim, and desire to secure by Letters Patent, is—

1. The process of making gelatin, which consists in subjecting the gelatin-yielding material to the simultaneous action of hot water and centrifugal force, dissolving the gelatin out of the material, passing the gelatin solution from the material by the action of gravity and centrifugal force and finally separating the gelatin from the water by concentration and drying.

2. The process of making gelatin which consists in subjecting the gelatin-yielding material to the simultaneous action of hot water and centrifugal force, dissolving the gelatin out of the material, extracting the gelatin solution from the material by the combined force of gravity and centrifugal motion and simultaneously filtering said solution.

3. The process of making gelatin which consists in washing the gelatin-yielding material, then cutting it up and subjecting it, in a divided state, to the simultaneous action of hot water and centrifugal force, dissolving the gelatin out of the material and extracting the gelatin solution from the material by the combined action of gravity and centrifugal force and simultaneously filtering said solution.

4. The process of making gelatin which consists in washing the gelatin-yielding material then cutting it up and subjecting it, in a divided state, to the simultaneous action of condensing steam and centrifugal force, dissolving the gelatin out of the material and extracting the gelatin solution from the material by the combined action of gravity and centrifugal force and simultaneously filtering the solution.

5. The process of making gelatin which consists in washing the gelatin-yielding material, then cutting it up and subjecting it, in a divided state, to the simultaneous action of condensing steam and centrifugal force, dissolving the gelatin out of the material, passing the solution from the material by gravity and centrifugal force, and thereby filtering the solution, collecting the solution, determining its density and finally drawing it off, substantially as described.

In witness whereof I have hereunto set my hand in presence of two witnesses.

WILLIAM CORMACK.

Witnesses:
WALLACE FAIRWEATHER,
JNO. ARMSTRONG, Jr.

---

It is hereby certified that the name of the assignee in Letters Patent No. 728,205, granted May 19, 1903, upon the application of William Cormack, of Eskbank, Scotland, for an improvement in "Processes of Making Gelatin," was erroneously written and printed "James Gray Flowerdew Lawson," whereas said name should have been written and printed *James Gray Flowerdew Lowson;* and that the said Letters Patent should be read with this correction therein that the same may conform to the record of the case in the Patent Office.

Signed and sealed this 28th day of July, A. D., 1903.

[SEAL.]

E. B. MOORE,
*Acting Commissioner of Patents.* water and centrifugal force, dissolving the gelatin out of the material and extracting the gelatin solution from the material by the combined action of gravity and centrifugal force and simultaneously filtering said solution.

4. The process of making gelatin which consists in washing the gelatin-yielding material then cutting it up and subjecting it, in a divided state, to the simultaneous action of condensing steam and centrifugal force, dissolving the gelatin out of the material and extracting the gelatin solution from the material by the combined action of gravity and centrifugal force and simultaneously filtering the solution.

5. The process of making gelatin which consists in washing the gelatin-yielding material, then cutting it up and subjecting it, in a divided state, to the simultaneous action of condensing steam and centrifugal force, dissolving the gelatin out of the material, passing the solution from the material by gravity and centrifugal force, and thereby filtering the solution, collecting the solution, determining its density and finally drawing it off, substantially as described.

In witness whereof I have hereunto set my hand in presence of two witnesses.

WILLIAM CORMACK.

Witnesses:
 WALLACE FAIRWEATHER,
 JNO. ARMSTRONG, Jr.

---

It is hereby certified that the name of the assignee in Letters Patent No. 728,205, granted May 19, 1903, upon the application of William Cormack, of Eskbank, Scotland, for an improvement in "Processes of Making Gelatin," was erroneously written and printed "James Gray Flowerdew Lawson," whereas said name should have been written and printed *James Gray Flowerdew Lowson;* and that the said Letters Patent should be read with this correction therein that the same may conform to the record of the case in the Patent Office.

Signed and sealed this 28th day of July, A. D., 1903.

[SEAL.]

E. B. MOORE,
*Acting Commissioner of Patents.*

It is hereby certified that the name of the assignee in Letters Patent No. 728,205, granted May 19, 1903, upon the application of William Cormack, of Eskbank, Scotland, for an improvement in "Processes of Making Gelatin," was erroneously written and printed "James Gray Flowerdew Lawson," whereas said name should have been written and printed *James Gray Flowerdew Lowson;* and that the said Letters Patent should be read with this correction therein that the same may conform to the record of the case in the Patent Office.

Signed and sealed this 28th day of July, A. D., 1903.

[SEAL.]

E. B. MOORE,
*Acting Commissioner of Patents.*